April 24, 1951  L. E. H. GUSTAVSSON  2,549,967
TOOL HOLDING DEVICE FOR MACHINE TOOLS
Filed July 31, 1946  2 Sheets-Sheet 1

April 24, 1951  L. E. H. GUSTAVSSON  2,549,967
TOOL HOLDING DEVICE FOR MACHINE TOOLS
Filed July 31, 1946  2 Sheets-Sheet 2
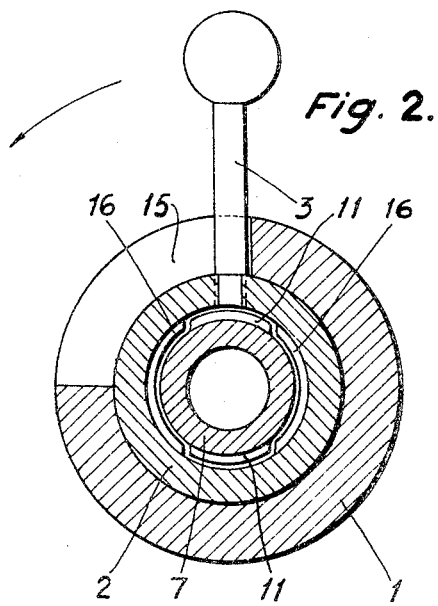
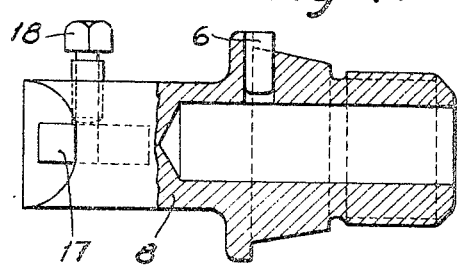
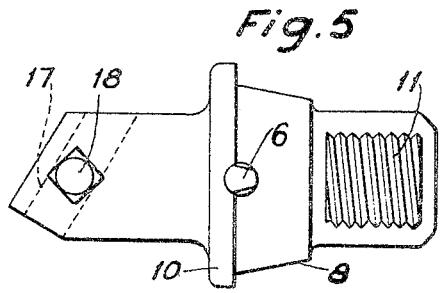

Patented Apr. 24, 1951

2,549,967

UNITED STATES PATENT OFFICE 2,549,967

TOOLHOLDING DEVICE FOR MACHINE TOOLS

Lars Erik Herbert Gustavsson, Karlskoga, Sweden

Application July 31, 1946, Serial No. 687,319
In Sweden October 27, 1944

6 Claims. (Cl. 279—51)

This invention relates to improvements in tool holding devices for machine tools, e. g. slide or turret lathes. In ordinary slide lathes and turret lathes it is usually not possible to quickly and correctly replace certain tools by other tools wherefore a machining that would conveniently have to be effected in a single machine has to be accomplished by a plurality of machines. This drawback will particularly affect machines of the kind, e. g. slide lathes, in which the possibility of changing tools is very limited so that series production of relatively simple objects will be unprofitable. In the machining of relatively large work pieces in vertical turret lathes, e. g., it will as a rule, viz. from considerations of space, not be possible to provide for erection of the required number of tools.

It is an object of the present invention to remove said drawbacks, viz. by the provision of means enabling machining requiring a large number of tools to be accomplished in a single and simple machine. Another object of the invention consists in the provision of improved means enabling quick successive and correct replacements of different tools used in the different steps of operation.

With the above and other objects in view the invention consists in certain combinations and arrangements of the parts hereinafter described, illustrated in the accompanying drawing and more particularly pointed out in the appended claims.

In the drawings:

Fig. 2 is a cross sectional view taken on the line II—II of Fig. 1;

Fig. 4 is a side view, partly in section, of a modification of the embodiment shown in Fig. 1; and Fig. 5 is a longitudinal view taken at right angles to Fig. 4.

Corresponding and like parts are referred to in the following description and indicated in all of the views of the drawing, by like reference characters.

Figure 1:
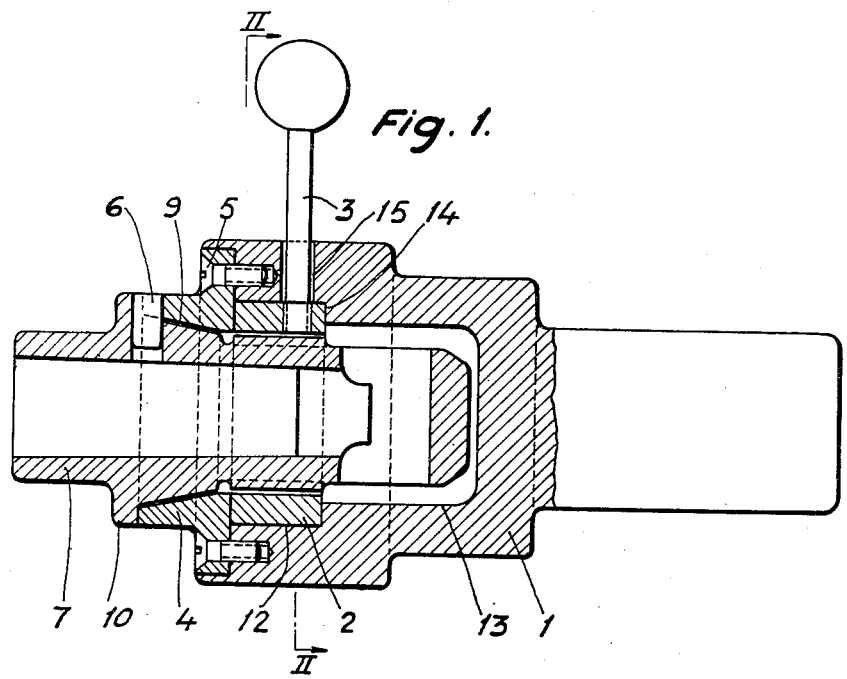
Fig. 1 is a longitudinal sectional view of an embodiment of the invention.
Figure 3:
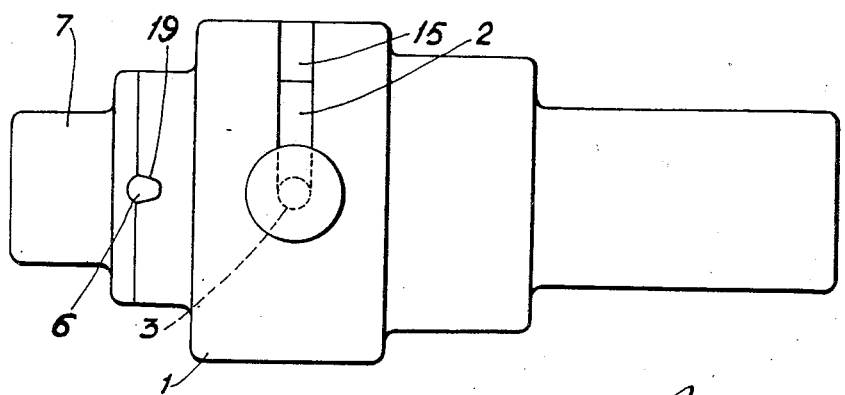
Fig. 3 is a longitudinal view taken at right angles to Fig. 1.

Referring to Figs. 1 to 3 of the drawing a flanged Morse taper sleeve or adapter 7 for drills or reamers is inserted into a body consisting of a socket 1 and a flanged ring 4 secured to the end thereof by means of screws 5. Sleeve 7 need not necessarily be formed to receive tapered shank tools and if desired may be provided with means for securely engaging other tools such as boring bars, lathe tools and the like. The ring 4 has a tapered bore and a radial notch 19 adapted to receive a pin 6 projecting radially from the sleeve 7 and being secured thereto. The socket 1 has a bore consisting of two cylindrical portions 12 and 13 of different diameters and an annular shoulder 14. An annular clamping member or nut 2 is rotatably inserted into the portion 12 of the bore between the shoulder 14 and the ring 4 which prevent axial movement of the nut. The nut 2 has interior interrupted threads consisting of two oppositely disposed segments 16. The sleeve 7 has corresponding exterior interrupted threads consisting of two segments 11 which can pass freely between the threaded segments 16 of the nut 2 when the sleeve is introduced into the body 1, 4. A handle 3 screwed into the nut 2 projects through a segmental slot 15 in the socket 1. The tapered bore of the ring 4 and the outer conical surface of the sleeve 7 have such diameters that there will be a small clearance between the conical surfaces when the flange 10 of the sleeve 7 engages the end of the ring 4.

When applying the tool to the tool holding device the sleeve 7 carrying the tool is introduced into the nut 2 whereby the pin 6 is caused to register with the notch 19. Thereafter the nut 2 is by means of the handle 3 turned through 70° to 80° so that the bayonet joint formed by the threaded segments 11 and 16 will interlock the sleeve 7 and the body of the tool holding device on pressing the flange 10 of the sleeve against the ring 4. By this arrangement tool holding sleeves comprising the same or various tools can easily and quickly be replaced and each tool will immediately and without adjustment occupy an exactly correct working position.

In the modified embodiment shown in Figs. 4 and 5 the member 8 is adapted to hold a chisel for internal turning inserted into a rectangular hole 17 and secured to the member 8 by means of a screw 18. In other respects this member is similar to the sleeve 7 described with reference to Figs. 1 to 3.

I claim:

1. A tool holder for interchangeably securing any one of a plurality of tools in an accurately centered predetermined axial position on a machine tool comprising a body adapted to be fixed to said machine tool, a bore in said body forming an elongated recess, a ring fixed to said body concentric with said bore and having an outwardly flared tapered inner surface, the outer radial edge of said ring forming an abutment, an annular groove in the wall of said bore, an annular clamping member rotatably mounted in said groove, a tool holding adapter receivable in said bore, means on said adapter for securing a tool thereto, a tapered outer surface on said adapter complementary to the tapered inner surface on said ring, a shoulder on said adapter disposed outwardly of the tapered surface, complementary interrupted threads on said adapter and said clamping member whereby said adapter may be inserted axially into said bore and upon partial rotation of said clamping member said adapter will be tightly clamped in position with said tapered surfaces and said shoulder and said abutment in engagement to thereby accurately center and axially position said adapter, a notch in said ring and a projection on said adapter engageable in said notch to prevent relative rotation between said adapter and said body.

2. A tool holder as defined in claim 1 in which said shoulder is so positioned relative to said tapered surfaces that inward movement of said adapter sufficient to cause contraction thereof by engagement of said tapered surfaces is prevented.

3. A tool holder for interchangeably securing any one of a plurality of tools in an accurately centered predetermined axial position on a machine tool comprising a body adapted to be fixed to said machine tool, a bore in said body forming an elongated recess, a ring fixed to said body concentric with said bore and having an outwardly flared tapered inner surface, the outer radial edge of said ring forming an abutment, an annular groove in the wall of said bore, an annular clamping member rotatably mounted in said groove, a tool holding adapter receivable in said bore, means on said adapter for securing a tool thereto, a tapered outer surface on said adapter complementary to the tapered inner surface on said ring, a shoulder on said adapter disposed outwardly of the tapered surface, complementary interrupted threads on said adapter and said clamping member whereby said adapter may be inserted axially into said bore and upon partial rotation of said clamping member said adapter will be tightly clamped in position with said tapered surfaces and said shoulder and said body to prevent relative rotation thereaccurately center and axially position said adapter, and cooperating means on said adapter and said abutment in engagement to thereby between.

4. A tool holder for interchangeably securing any one of a plurality of tools in an accurately centered predetermined axial position on a machine tool comprising a body adapted to be fixed to said machine tool, a bore in said body forming an elongated recess, a ring fixed to said body concentric with said bore and having an outwardly flared tapered inner surface, the outer radial edge of said ring forming an abutment, an annular groove in the wall of said bore, an annular clamping member rotatably mounted in said groove, a tool holding adapter receivable in said bore, means on said adapter for securing a tool thereto, a tapered outer surface on said adapter complementary to the tapered inner surface on said ring, a shoulder on said adapter disposed outwardly of the tapered surface, complementary interrupted threads on said adapter and said clamping member whereby said adapter may be inserted axially into said bore and upon partial rotation of said clamping member said adapter will be tightly clamped in position with said tapered surfaces and said shoulder and said abutment in engagement to thereby accurately center and axially position said adapter.

5. A tool holder for interchangeably securing any one of a plurality of tools in an accurately centered predetermined axial position on a machine tool comprising a body adapted to be fixed to said machine tool, a bore in said body forming a recess, a ring fixed to said body concentric with said bore and having an outwardly flared tapered inner surface, the outer radial edge of said ring forming an abutment, an annular clamping member rotatably mounted in said bore, a tool holding adapter receivable in said bore, means on said adapter for securing a tool thereto, a tapered outer surface on said adapter, complementary to said tapered inner surface on said ring, a shoulder on said adapter, complementary bayonet joint means on said adapter and said clamping member whereby said adapter may be inserted axially into said bore and upon partial rotation of said clamping member said adapter will be tightly clamped in position with said tapered surfaces and said shoulder and said abutment in engagement to thereby accurately center and axially position said adapter.

6. A tool holder for interchangeably securing any one of a plurality of tools in an accurately centered predetermined axial position on a machine tool comprising a body adapted to be fixed to said machine tool, a bore in said body forming a recess, an outwardly flared tapered inner surface adjacent the opening of said bore and a surface adjacent thereto forming an abutment, an annular clamping member rotatably mounted in said bore, a tool holding adapter receivable in said bore, means on said adapter for securing a tool thereto, a tapered outer surface on said adapter complementary to said tapered inner surface, a shoulder on said adapter, complementary bayonet joint means on said adapter and said clamping member whereby said adapter may be inserted axially into said bore and upon partial rotation of said clamping member said adapter will be tightly clamped in position with said tapered surfaces and said shoulder and said abutment in engagement to thereby accurately center and axially position said adapter.

LARS ERIK HERBERT GUSTAVSSON.

REFERENCES CITED

The following references are of record in the file of this patent:

UNITED STATES PATENTS

| Number | Name | Date |
|---|---|---|
| 60,163 | Faught | Dec. 4, 1866 |
| 257,157 | Faught | May 2, 1882 |
| 1,167,943 | Short | Jan. 11, 1916 |
| 1,372,238 | Kreiter | Mar. 22, 1921 |
| 1,463,176 | Schieldge | July 31, 1923 |
| 1,997,858 | Clawson | Apr. 16, 1935 |